Figure 1:
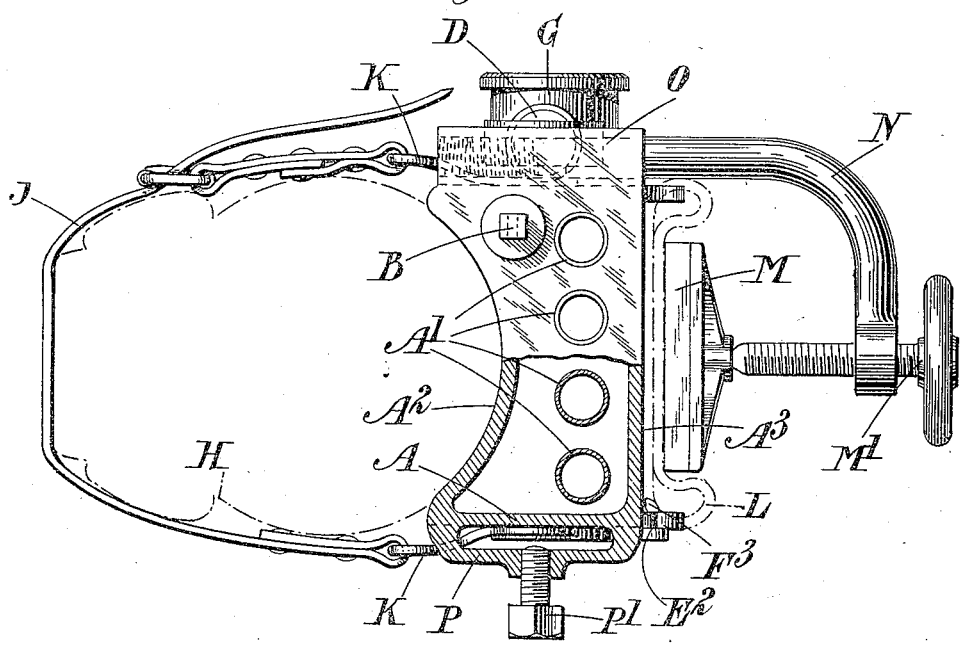

No. 856,241. PATENTED JUNE 11, 1907.
H. H. FROST.
PORTABLE SELF CONTAINED VULCANIZING APPARATUS.
APPLICATION FILED JUNE 7, 1906.

2 SHEETS—SHEET 1.

Witnesses:
Albert T. Day
Henry Barnes

Inventor:
Henry Harvey Frost
by Henry D. Williams
Atty.

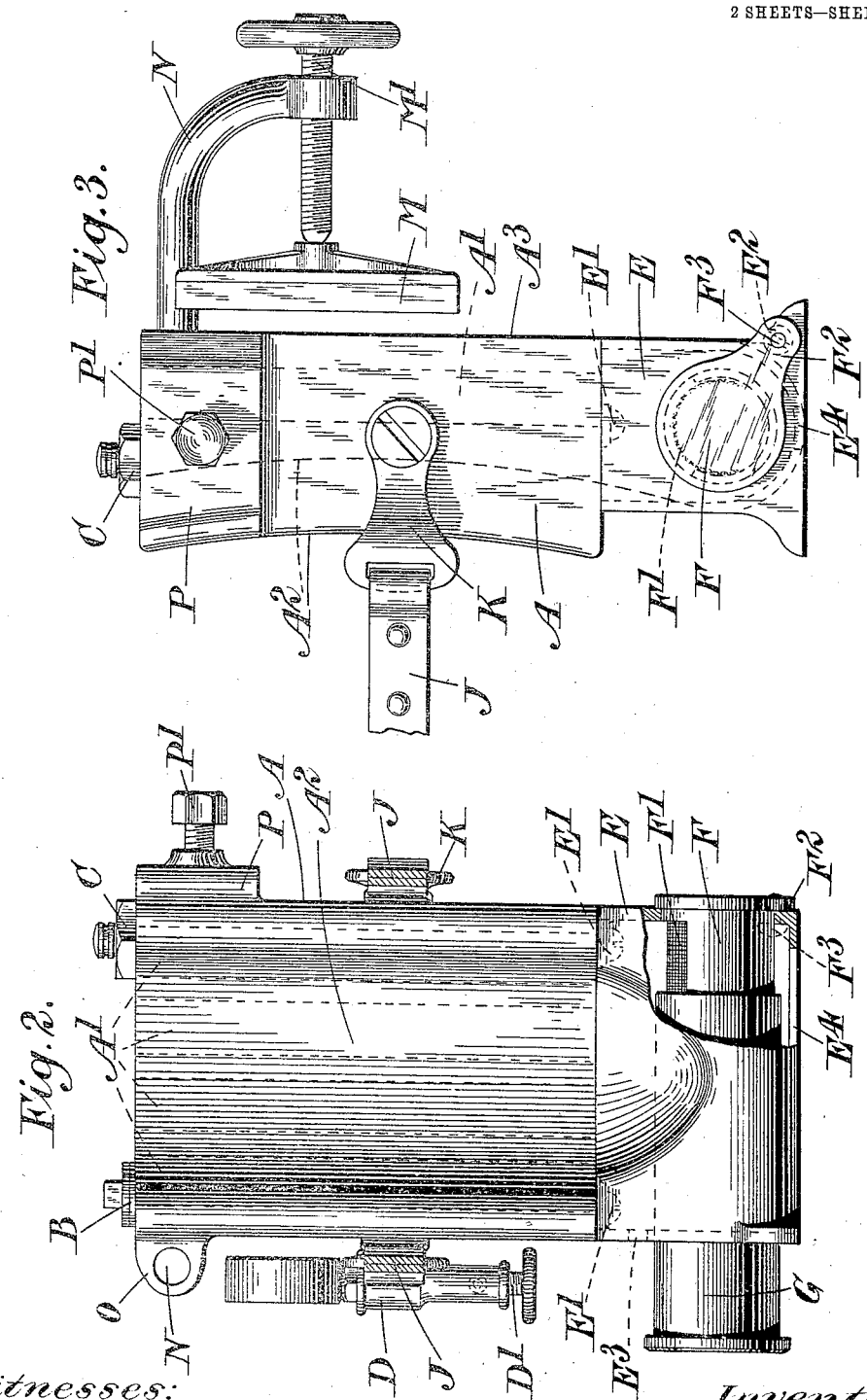

UNITED STATES PATENT OFFICE.

HENRY HARVEY FROST, OF LONDON, ENGLAND.

PORTABLE SELF-CONTAINED VULCANIZING APPARATUS.

No. 856,241.  Specification of Letters Patent.  Patented June 11, 1907.

Application filed June 7, 1906. Serial No. 320,641.

*To all whom it may concern:*

Be it known that I, HENRY HARVEY FROST, a subject of the King of England, and residing in London, England, have invented certain new and useful Improvements in Portable Self-Contained Vulcanizing Apparatus, of which the following is a specification.

This invention relates to portable self-contained vulcanizing apparatus and refers more particularly to apparatus for repairing pneumatic tires and tire covers of motor vehicles.

The chief object of the invention is to provide a handy and efficient apparatus, compact in form and of such proportions that it can readily be carried upon a motor vehicle without inconvenience, thus permitting repairs to be executed whenever necessary.

According to this invention the apparatus comprises a casing or body which is heated internally, the outer surfaces of one or more of the walls forming vulcanizing surfaces. Preferably the casing or body forms or incloses a steam generator having a burner or heater disposed at its lower end.

In a preferred construction the casing is made of one piece or casting, the interior being the generator and the outer surface of one or more of the walls constituting the vulcanizing surface. One of the walls is curved to conform more or less to the contour of a tire cover when in position upon the vehicle wheel, the other walls being preferably flat. The burner is situated at the lower end of the casting and the heating gases are conveyed up through the generator by a number of flues or conduits which pass from end to end of the casting, thus giving a straight through draft and dividing the water space within the generator in such a manner that steam can be got up very quickly.

The burner is preferably designed for use with spirit and consists of a cylindrical casing open at the top to form the ignition surface, a cover of wire gauze being provided in the manner usual with such burners. The burner is supported in a casing detachably secured to the generator. This casing is provided with air inlets at its lower side so that the air enters underneath and encircles the burner, thus supplying air in the most efficient way, but without liability of the burner being extinguished by too strong a draft. At one end the burner is provided with a catch so that by giving it a partial rotation it is locked in position within the casing. From the other end of the burner extends a rotatable shield or extinguisher by moving which the flame can be increased or decreased or entirely extinguished at will. This regulator can be operated externally.

An opening is provided for the insertion of the light to ignite the fuel in the burner. The side of the burner casing corresponding to the curved side of the generator is preferably also curved to receive a part of the tire cover under treatment and this portion is prevented from being at a greater heat than the walls of the generator by the air current supplied to the burner.

At the top of the generator is provided a filling plug and safety valve and the pressure gage is also mounted conveniently at one side.

The conduit communicating between the pressure gage and the interior of the generator may also be employed as a siphon tube to the lower end of which is attached a drip cock which acts as a gage and prevents the generator being supplied with too much water.

The entire apparatus can be readily and securely clamped to a wheel to vulcanize a damaged portion of the cover without necessitating the cover being taken from the wheel or the wheel detached from the vehicle. For this purpose detachable or other lugs are provided on the generator to which are connected a strap and buckle, the strap being adapted to pass around the wheel rim and to be secured by the buckle, or a chain, band or the like may be employed.

In addition to employing a curved surface one of the flat surfaces, preferably that opposite to the curved surface may be employed for vulcanizing insertions upon the inner tube. For this purpose a screwed or other bracket is secured to the generator and extends over the flat wall of the generator, being provided at its outer end with an adjustable screw or clamping device which can be caused to press upon the part of the tube under treatment.

When only the flat wall of the generator is employed for vulcanizing purposes the entire apparatus may be suspended from the lamp bracket usually carried on motors, a socket being provided on the generator and a clamping screw. This socket may also be employed for carrying the apparatus when not in use upon the lamp bracket or upon a similar bracket on the vehicle.

The curved wall of the generator may be so made that the heat is graduated toward the ends, and thus prevent damage to the tire cover adjacent to the part being vulcanized.

The apparatus when used for treating the outer cover of the tire is conveniently placed and strapped or fixed in position when the tire is partially deflated, after which the tire is pumped up or inflated so that the surface conforms to the vulcanizing surface and the necessary pressure for vulcanizing is provided.

In the accompanying drawings:—Figure 1 is a plan of one construction of portable vulcanizer according to this invention partly in section and shown in its operative position in relation to a tire, and Figs. 2 and 3 are elevations taken at right angles to each other, a portion of Fig. 2 being broken away for the sake of clearness.

Like letters indicate like parts throughout the drawings.

A is a casing—preferably a casting—forming a steam generator which is provided with heating flues $A^1$ passing directly through it from top to bottom. The steam generator A is provided with a filling plug B, a safety valve C and a pressure gage fitting D. This fitting D is provided with a small pet cock $D^1$ and is so placed that if the generator is supplied with too much water the superfluous amount may be allowed to escape.

At the lower part of the steam generator is a burner casing E detachably secured to the generator by lugs and screws $E^1$. A cylindrical burner F fits into a hole at one side of the casing E and an adjustable regulating shield G fitting over the burner F passes through another circular opening in the other side. The upper portion of the burner is covered with wire gauze as at $F^1$, and a lug $F^2$ on the head of the burner is provided with a screw $F^3$ which can engage with a notch or recess $E^2$ in the adjacent portion of the casing E, thus forming a locking joint or catch holding the burner F in position while the regulating shield G is moved in or out to control or totally extinguish the flame. It will be appreciated that the shield G extinguishes the flame as it is pushed in, only that part of the burner being active which is uncovered. The shield may be graduated or provided with a stop so that the proper position to permit a flame sufficient only to maintain a required steam pressure can be instantly obtained. An aperture $E^3$ is provided in the casing through which the fuel in the burner may be ignited.

The steam generator A is provided with two vulcanizing surfaces; one $A^2$, is made concave in two directions so as to fit the external part of the tire. The other vulcanizing surface, $A^3$, is flat and is intended more particularly to be used for vulcanizing patches on inner tubes or on covers when removed from the wheel rim.

In Fig. 1 the vulcanizer is shown as attached to a tire and wheel rim indicated in chain lines at H, the attachment being by means of straps J secured to the vulcanizer by lugs K. An inner tube is diagrammatically represented at L and it will be seen that pressure is applied to it by means of a plate M and screw $M^1$, this screw being mounted in an arm N screwing into the lug O forming part of the generator casing. The lugs K are not rigidly fastened to the walls of the vulcanizer but may be turned round so that the straps J may be used to press the flat vulcanizing surface $A^3$ into contact with a flat tread if the tire be provided with one, or again the flat wall $A^3$ can be used when separate molds are carried, formed to suit the particular shape of the tire.

The vulcanizer may conveniently be carried upon a bracket in some suitable position on the car and for this purpose a socket P and screw $P^1$ are provided. The socket P is formed to suit a lamp bracket as in practice it is found very convenient to attach the vulcanizer to that bracket when carrying out repairs on the detached cover or inner tube.

It will be seen that the bottom portion of the burner casing E is curved and is provided with an air inlet $E^4$. By this arrangement the incoming air is caused to pass up between the tube F and the inside of the casing E in such a way that there is little tendency for it to extinguish the flame, as might be the case were the air inlet openings at the side of the casing. A further advantage of this construction is that the air passing in at the opening $E^4$ and round between the burner and the walls of the burner casing E, prevents the casing from becoming too hot and damaging the tire.

The walls of the steam generator forming the vulcanizing surfaces may be graduated in thickness or may be extended or otherwise shaped so that the heat is graduated toward the edges of the surfaces covered by the vulcanizer.

What I claim as my invention and desire to secure by Letters Patent is:—

1. A portable self-contained vulcanizer having, in combination, a steam generator provided with a lateral vulcanizing surface formed to conform to the surface of a tire, means for clamping the generator to a tire in place on a wheel, a burner located beneath the generator, and a plurality of flues passing vertically through the water space of the generator from the burner to the upper end of the generator.

2. A portable self-contained vulcanizer having, in combination, a steam generator provided with a vulcanizing surface, a burner connected with the generator and provided with a curved upper surface, and a shield curved to conform to the upper surface of the burner and movable over the burner to cover more or less of its surface.

3. A portable self-contained vulcanizer having, in combination, a steam generator provided with a vulcanizing surface, a cylindrical burner connected with the generator, and a cylindrical shield surrounding the burner and movable longitudinally to cover more or less of the burner.

4. A portable self-contained vulcanizer having, in combination, a steam generator provided with a vulcanizing surface, a cylindrical burner located beneath the generator, and a burner casing inclosing the bottom of the burner but spaced therefrom to form an air passage and provided with an air-inlet opening beneath the burner.

5. A portable self-contained vulcanizer having, in combination, a steam generator provided with a vulcanizing surface, a burner casing located beneath the generator, a cylindrical burner mounted horizontally in the burner casing and removable lengthwise therefrom, and a cylindrical shield inclosing a portion of the burner and movable lengthwise to cover more or less of the burner.

In testimony whereof I have signed my name to this specification in the presence of two subscribing witnesses.

HENRY HARVEY FROST.

Witnesses:
 ALFRED J. BRULF,
 HARRY B. BRIDGE.